Mar. 20, 1923. 1,449,020
J. W. TEASLEY ET AL
MUD SHOE FOR USE WITH AUTOMOBILES OR OTHER VEHICLES
Filed June 8, 1922
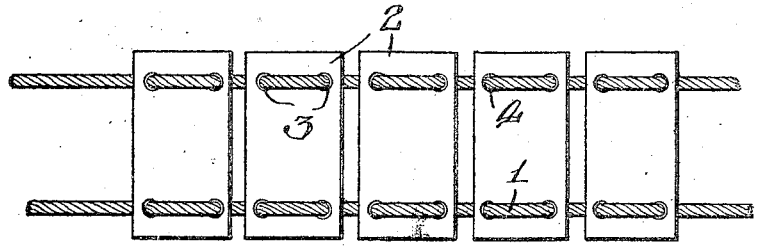
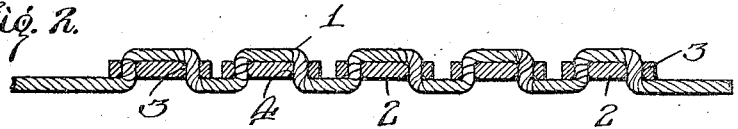
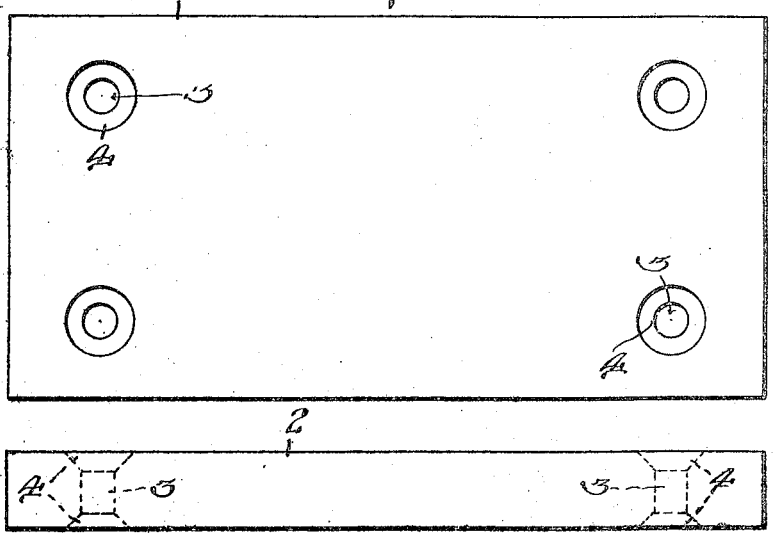
Inventor
Joseph. W. Teasley  Grady Mitchell Giddens Patented Mar. 20, 1923.

1,449,020

UNITED STATES PATENT OFFICE.

JOSEPH W. TEASLEY AND GRADY MITCHELL GIDDENS, OF WEST TAMPA, FLORIDA.

MUD SHOE FOR USE WITH AUTOMOBILES OR OTHER VEHICLES.

Application filed June 8, 1922. Serial No. 566,914.

*To all whom it may concern:*

Be it known that we, JOSEPH W. TEASLEY and GRADY M. GIDDENS, citizens of the United States, residing at West Tampa, in the county of Hillsborough and State of Florida, have invented certain new and useful Improvements in Mud Shoes for Use with Automobiles or Other Vehicles; and we do hereby declare the following to be a full, clear, and exact description of the invention, such as will enable others skilled in the art to which it appertains to make and use the same.

The invention comprises a flexible band or strip made of a number of wooden slats connected together by ropes or chains, and so arranged as to either be rolled up and put out of the way, as under the seat of the vehicles, when not in use, or spread out on the ground to engage the bottom of the wheel, as desired.

In practice the device may be used either to extricate the vehicle when it is stalled in sand, quicksand, mud or the like, or it may be placed upon the surface of the ground when danger of the wheels sinking into same is anticipated.

The invention will be more fully understood after reference to the accompanying drawings, in which like parts are indicated by similar reference symbols throughout the several views, and in which:—

Figure 1 is a plan view of part of the device in the extended form.

Figure 2 shows a transverse section through one set of holes of the various slats showing the connecting rope in elevation.

Figure 3 is a plan view, on a larger scale, of a single one of the slats as detached from the fastening rope or chain; and Figure 4 is a side elevation of the slat shown in Fig. 3.

The slats 2 are made of wooden boards, preferably of sufficient breadth, width and thickness for the purpose used; for instance, each slat may be about 12 inches long, 6 inches wide and one and one-quarter inches thick; but these dimensions may be varied to suit, according to the nature of the wood employed and the weight of the vehicle on which the device is to be used.

Each slat 2 is provided near each end with a pair of perforations 3, which are preferably extended at each end, as at 4, to permit the rope or chain 1 to be conveniently rove therethrough, as shown for instance in Fig. 2. The slats are spaced far enough apart so as to permit the flexible shoe to be rolled up in a compact form and stored away on the vehicle when not in use.

While we have shown in the drawings the rope 1, obviously chain or wire cable may be used if desired.

Moreover while we have shown one embodiment of the invention in its preferred form, it will be obvious that various changes might be made in the construction, combination and arrangement of parts which could be used without departing from the spirit of our invention; and we do not mean to limit the invention to such details except as particularly pointed out in the claims.

Having thus described our invention what we claim and desire to secure by Letters Patent of the United States is:—

1. A mud shoe for use on vehicles, comprising a flexible strip composed of a series of slats, each provided with a pair of perforations near each end, with flexible connectors rove through said perforations, the said slats being spaced apart from each other when in the assembled relation.

2. A mud shoe for use on vehicles, comprising a flexible strip composed of a series of wooden slats, each provided with a pair of perforations at each end, the said perforations being extended on each side of the slats, with flexible connectors rove through said pairs of perforations, and the said slats being spaced apart on said flexible connectors to permit the rolling up of the shoe when not in use.

3. A mud shoe for use on vehicles, comprising a flexible strip composed of a series of wooden slats, each provided with a pair of perforations at each end, the said perforations being extended on each side of the slats, with ropes rove through said pair of perforations, and the said slats being spaced apart on said ropes to permit the rolling up of the shoe when not in use.

JOSEPH W. TEASLEY.
GRADY MITCHELL GIDDENS.

Witnesses:
C. T. MILES,
JOEL A. PHILLIPS.